United States Statutory Invention Registration [19]

[11] Reg. Number: H30

Siemer [45] Published: Mar. 4, 1986

[54] METHOD AND APPARATUS FOR THE PREPARATION OF LIQUID SAMPLES FOR DETERMINATION OF BORON

[75] Inventor: Darryl D. Siemer, Idaho Falls, Id.

[73] Assignee: The United States of America as represented by the United States Department of Energy, Washington, D.C.

[21] Appl. No.: 447,846

[22] Filed: Dec. 8, 1982

[51] Int. Cl.[4] ..... G01N 31/12; G01N 31/00

[52] U.S. Cl. ..... 436/171; 436/127; 436/175; 436/177; 436/181; 436/182; 422/68; 422/80

[58] Field of Search ..... 436/127, 171, 175, 177, 436/ 77, 181, 182

[56] References Cited

U.S. PATENT DOCUMENTS

| | | | |
|---|---|---|---|
| 3,801,282 | 4/1974 | Manning et al. | 436/182 |
| 3,844,894 | 10/1974 | Kronick et al. | 435/4 X |
| 3,907,501 | 9/1975 | Sass et al. | 436/128 |
| 4,164,416 | 8/1979 | Gehri | 75/72 |
| 4,247,522 | 1/1981 | Pyman et al. | 423/8 |
| 4,268,478 | 5/1981 | Huber | 436/181 X |
| 4,365,018 | 12/1982 | Crutchfield et al. | 430/523 X |

OTHER PUBLICATIONS

Weber et al., Ind. Eng. Chem., Anal. Ed. vol. 10, p. 273 (1938).

Belcher et al., Analytica Chimica Acta, vol. 71, #2, pp. 255-262, (1974).

Burguera et al., Analytica Chimica Acta, vol. 127, pp. 227-231, (Jun. 1, 1981).

*Primary Examiner*—Teddy S. Gron

*Attorney, Agent, or Firm*—James W. Weinberger; Walter L. Rees; Judson R. Hightower

[57] ABSTRACT

A method and apparatus for the preparation of a liquid sample for the quantitative determination of boron by flame photometry. The sample is combined in a vessel with sulfuric acid, and an excess of methanol is added thereto. The methanol reacts with any boron present in the sample to form trimethyl borate which is volatilized by the heat of reaction between the excess methanol and sulfuric acid. The volatilized trimethyl borate is withdrawn from the vessel by either a partial vacuum or a positive pressure and is rapidly transferred to a standard flame photometer. The method is free of interference from typical boron concomitants.

14 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND APPARATUS FOR THE PREPARATION OF LIQUID SAMPLES FOR DETERMINATION OF BORON

CONTRACTUAL ORIGIN OF THE INVENTION

The U.S. Government has rights in this invention pursuant to Contract No. DE-AC07-79IDO1675 between the U.S. Department of Energy and the Exxon Nuclear Idaho Company, Inc.

BACKGROUND OF THE INVENTION

This invention relates to a method and apparatus for the preparation of a liquid sample for quantitative determination of boron. More particularly, this invention relates to a method and apparatus for the preparation of a liquid sample for quantitative determination of boron wherein the boron is converted to the trimethyl borate ester which is immediately withdrawn in the gaseous state for quantitative determination by flame photometry.

Boron is used in many ways in industrial processes, including various stages of the production of nuclear energy from fissile materials. It is frequently necessary to analyze industrial products and byproducts for their boron content. A variety of methods have been developed for both the qualitative and quantitative determination of boron including gravimetry, titration, electrochemistry and photometry. Photometric and spectrophotometric methods in particular have been developed because of their ease of performance, accuracy, and reliability.

Flame photometry has been extensively applied to boron analysis. The sample of interest is introduced into a flame in a controlled manner, whereupon the boron in the sample is oxidized to $BO_2$, which in turn is excited to emit a characteristic spectrum, the intensity of which is a function of the quantity of boron present in the flame. In the last 30 years flame photometry has been used on many different types of boron-containing samples with varying degrees of success. A comprehensive review of this work is given in *Analytical Flame Spectroscopy,* Ch. 5, "Nonmetals" by Paul T. Golbert, p. 188–213, McMillan and Co. Ltd., London, R. Mavrodineanu, ed. (1970).

One major problem with flame photometric analysis is that other elements present in the sample may interfere with the boron spectrum and give erroneous results. It is thus often necessary to separate the boron from the sample prior to analysis. Many boron separation techniques are well known such as electrolysis, chromatography, precipitation, extraction, and distillation. These techniques are often time-consuming and laborious.

Some of these techniques have been used in conjunction with flame photometry. For example, boron may be extracted with methyl isobutyl ketone and the organic solution introduced into a flame, as described by Maeck, et al., *Analytical Chemistry,* 1963, 35, 63–65. This method is relatively rapid, but it is subject to interferences from ions which are extracted with the boron into the organic phase. Alternatively, it is known that micro amounts of boron can be quantitatively separated from an acid solution by distillation with methanol to form the volatile trimethyl borate ester. The ester may be condensed in a collection flask and analyzed by ordinary means. This method has the disadvantage of requiring distillations of long duration, often on the order of several hours. It may be seen that a need exists for a method of preparing a sample for quantitative determination of boron by flame photometry which is not only easy and rapid but which also minimizes chemical interferences.

SUMMARY OF THE INVENTION

It is thus one object of the invention to provide a method of preparing a sample for quantitative determination of boron by flame photometry so that interference from other elements in the sample will be minimized.

It is another object of the invention to provide such a method which may be easily and rapidly performed.

It is yet another object of the invention to provide an apparatus suitable for such a method.

Additional objects, advantages, and novel features of the invention will be set forth in part in the following description.

In accordance with the invention, a method and apparatus for sample preparation are provided which allow rapid separation of boron from the sample and immediate transfer of the boron to the flame photometer. The sample of interest is mixed with sulfuric acid in a relatively small vessel. An excess of methanol is added to the vessel. The methanol reacts stoichiometrically with boron in the presence of acid to form the volatile trimethyl borate ester. The excess methanol reacts exothermically with the sulfuric acid. The vessel is designed to have a small heat capacity so that heat generated by the methanol-sulfuric acid reaction is available to rapidly volatilize the trimethyl borate ester. The volatilized ester may then be immediately transferred to the flame photometer by means such as a sample pick-up tube extending from the vessel to the flame photometric apparatus.

It may be seen that the method is very rapid; the trimethyl borate is transferred to the flame photometer within seconds after it is produced. In addition, the method is specific to boron in that most common elements do not react with methanol to form volatile esters. The apparatus is simple to use and is designed to have minimum heat capacity and minimum dead space to maximize volatilization of the borate ester and to allow the reaction to proceed quickly. The apparatus is also simple to operate and readily adaptable to existing flame photometers.

DETAILED DESCRIPTION OF THE INVENTION

Figure 1:
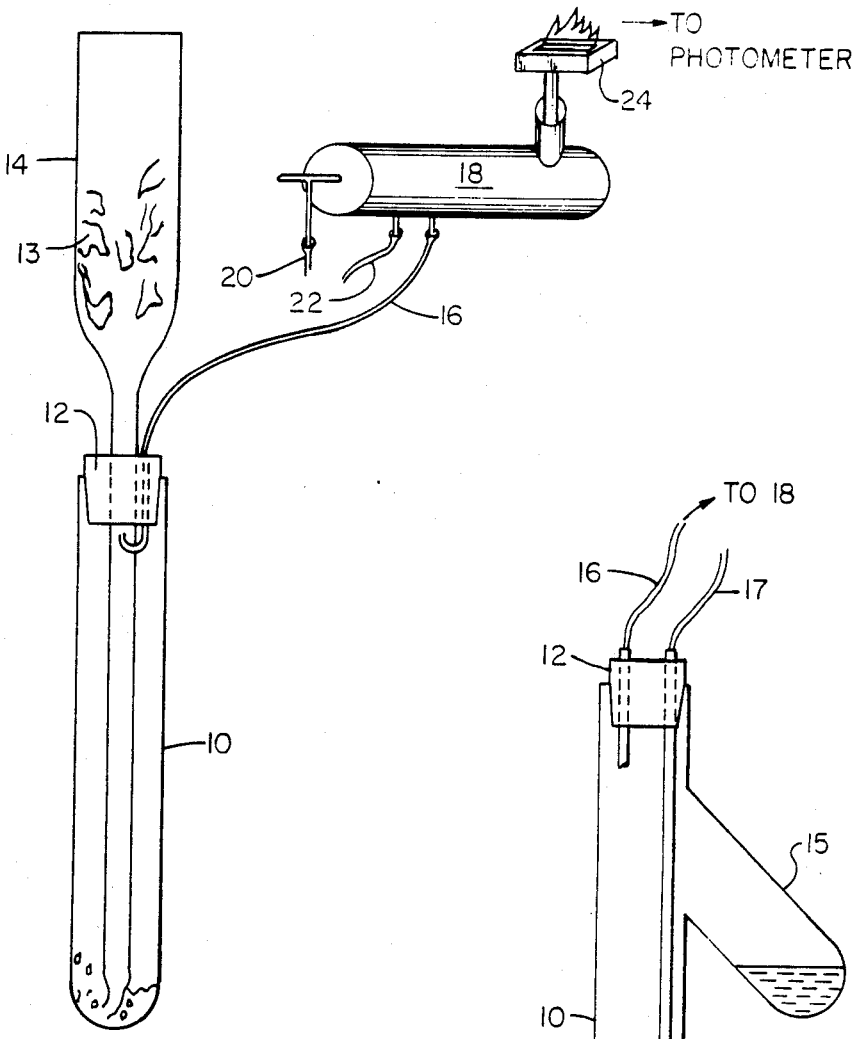
FIG. 1 is an illustration of an embodiment of the apparatus wherein trimethyl borate is withdrawn from the vessel by means of a partial vacuum.

The subject invention is most readily understood by reference to FIG. 1 which is an illustration of an embodiment of the inventive apparatus. A measured aliquot of the sample to be analyzed is added to vessel 10 where it is mixed with a known volume of sulfuric acid preferably about ten times the volume of the sample. The vessel is sealed by conventional stopper means 12 provided with an orifice in the center. A generally tube-shaped member 14 has a wider portion which extends above vessel 10 and a narrower portion which extends through said orifice of said stopper means 12 into said vessel 10. The wider portion of tube-shaped member 14 may be provided with inwardly pointing glass fingers 13. A known quantity of methanol, about three times the volume of sulfuric acid is added to vessel 10 through tube-shaped member 14 from about 3 to 10 minutes after the sample and sulfuric acid are combined. When the methanol mixes with the solution in vessel 10, several chemical reactions occur. The methanol reacts with the boron present in the sample to form the volatile trimethyl borate ester according to the reaction $$H_3BO_3 + 3CH_3OH \xrightarrow{H+} (CH_3O)_3B + 3H_2O$$

The methanol is added in sufficient excess so that it also reacts with the sulfuric acid in an exothermic manner. The methanol and sulfuric acid are present in sufficient excess to generate enough heat to volatilize the trimethyl borate ester produced. Fingers 13 of tube-shaped member 14 prevent the expulsion of liquid from the apparatus which might otherwise result from the exothermic reaction.

The borate ester when volatilized passes upward through said vessel 10 to sample pickup tube 16 which extends from vessel 10 through stopper means 12 to the flame photometer. The flame photometric apparatus includes a nebulizer 18 in which the sample is mixed with fuel from inlet 20 and air from inlet 22 before entering the flame at burner head 24. The movement of the gases through nebulizer 18 results in a partial vacuum on vessel 10 which facilitates the flow of the trimethyl borate to nebulizer 18. The trimethyl borate is oxidized in the flame to $BO_2$ which is excited to emit a characteristic spectrum. The quantity of boron in the original sample is measured by determining the spectral intensity at a preselected wavelength. Commercially available atomic emission spectrometers, not shown, are suitable for this purpose. The output is typically a peak recorded by a chart recorder. Either the height of the peak or the area under it may be used as a measure of the quantity of boron in the sample.

Figure 2:
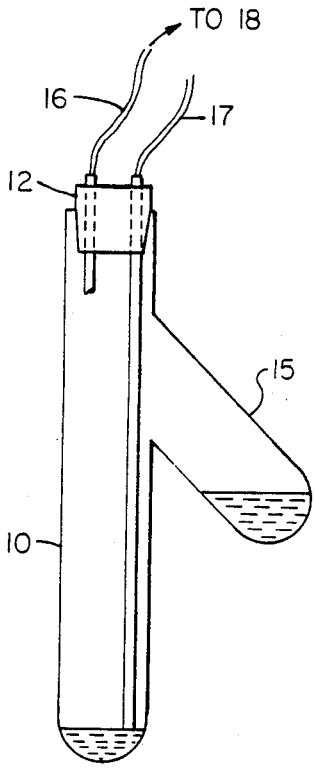
FIG. 2 is an illustration of an embodiment of the apparatus wherein trimethyl borate is withdrawn from the vessel by means of the application of a positive pressure to the vessel.

FIG. 2 is an illustration of an alternative embodiment of the apparatus wherein trimethyl borate is withdrawn from vessel 10 by the application of a positive pressure to the vessel. Vessel 10 is provided with sidearm 15 which contains a predetermined quantity of methanol. The sample and sulfuric acid are combined in vessel 10 as previously described. Vessel 10 is then tilted at an angle so that methanol in sidearm 15 pours into vessel 10 and mixes with the sample and sulfuric acid. The reactions between methanol and sulfuric acid and methanol and the boron present in the sample progress as previously described such that trimethyl borate is generated and volatilized. Stopper means 12 in this embodiment is provided with two orifices, one for sample pickup tube 16 and another for air inlet 17. Air is forced through inlet 17 into vessel 10 at a rate of about 2 l/minute to purge the vessel of the trimethyl borate ester through sample pickup tube 16. This results in a greater concentration of trimethyl borate in the flame so that the emission is much brighter. The recorded peak is then much sharper and can be more accurately integrated.

The emitted signal at a particular wavelength is recorded as a peak. Either the peak integral or the peak height may be used as a measure of analytical response. The peak integral is generally preferable to the peak height because the peak integral is less dependent upon variations in the rate of methanol addition, differences in solution volumes and differences in gas flows. This is especially true in the first described embodiment of the apparatus wherein the trimethyl borate is withdrawn from the vessel more slowly. In the second embodiment of the invention in which the trimethyl borate is purged from the vessel quickly by means of flowing air, the recorded peak is sharper and peak heights may be just as reliable as peak integrals.

The accuracy of the inventive method is excellent when compared with other analytical methods. Table I shows a comparative study of the inventive method with the method of inductively coupled plasma atomic emission spectroscopy (ICP AES). The close correspondence of the measured boron values for each sample is readily apparent. It should be noted that while no prior sample preparation procedures were required for the inventive method, the ICP AES method required an extraction-back extraction "clean up" procedure with tributyl phosphate and kerosene because of serious spectral interference by uranium and other metals present.

TABLE I

COMPARISON OF TRIMETHYL BORATE - FLAME PROCEDURE WITH ICP-AES

| Sample[1] | ICP-AES[2] (g/l) | Trimethyl borate procedure (g/l) |
|---|---|---|
| 1 | 3.98 | 4.02 |
| 2 | 7.11 | 7.03 |
| 3 | 8.57 | 8.50 |
| 4 | 6.87 | 6.72 |
| 5 | 5.20 | 5.19 |
| 6 | 4.37 | 4.43 |
| 7 | 6.16 | 6.15 |

[1]These samples represent a cross section of uranium reprocessing plant process streams and contain widely varying concentrations of uranium and dissolved cladding material.

[2]The ICP AES instrument consists of a Jarrell Ash torch, power supply, and impedance matching box; a one-meter Spex monochromator, and a mechanical chopper, lock-in amplifier, photomultiplier light detection system.

The precision of the method is typically on the order of 1% to 2% relative standard deviation at total boron levels ranging from 15 to 50 μg. The detection limit, which is defined as that mass of boron giving a signal equal to three times the standard deviation of the signal given by blank samples, is on the order of 0.2 μg and the analytical response is linear from the detection limit to well over 100 μg of boron.

It may be seen that there should be enough acid to effectively dehydrate the sample and enough methanol to ensure rapid ester formation. The highly exothermic reaction between methanol and sulfuric acid generates enough heat to raise the temperature of the reaction mixture to within a few degrees of the boiling point of the borate ester (65° C.) if enough of two reagents is used. The relative volumes of samples to sulfuric acid to methanol should be on the order of 1:10:30. Integrated emission signals for a fixed amount of boron in 10 μl of water varies less than 10% as the total reagent volume varies from 400 μl to 1300 μl, as long as the approximate ⅓ ratio of acid to methanol volumes is maintained. For example, a sample aliquot of 2 to 30 μl may be reacted with 300 μl of acid and 1,000 μl of methanol. These quantities are convenient for routine analytical practice.

The optimal analytical wavelength of observation will depend on the specific atomic emission spectrometer used. Either the 548 nm band or the 518 nm emission band of $BO_2$ give satisfactory results. The 548 band may be somewhat brighter.

The results obtained may depend on flame stoichiometry. Background emission may vary depending on the ratio of fuel to oxidant in the flame. It is possible to approximate ideal flame stoichiometry. This may be done by first setting the air flow through the nebulizer and then setting the acetylene flow such that no change in background emission is observed when the sample pickup tube 16 is alternatively inserted into and removed from a quantity of methanol. Then, if no change in the signal is due to the presence or absence of methanol, it may be known that the entire signal observed is due to the emission of excited boron.

The inventive method is particularly adaptable to solutions which are byproducts of nuclear reprocessing and which may contain high concentrations of ionic matrix concomitants ranging from less than 1% to as much as 40% total salts by weight. These may include uranium cladding elements such as stainless steel, zircaloy, or aluminum, or hydrofluoric acid, nitric acid, or uranium. The solutions may also contain small quantities of other fuel element components, assorted fission products and neutron poisons such as gadolinium or cadmium. Boron is deliberately added to these process streams to serve as a neutron poison at a desired concentration level on the order of ½% by weight. The method has been shown to be free from interference of cationic and anionic species encountered in either extant or anticipated uranium reprocessing plant solution streams. Various solutions listed in Table II were used to investigate possible interferences. Random combinations of any five of these concomitants were added to 5 μl samples containing 25 μg of boron. The added interferents caused no noticable signal perturbation.

TABLE II

MATRIX CONCOMITANTS[1,2]

| Concomitant | Concentration | Form |
|---|---|---|
| U (VI) | 400 g/l | nitrate |
| Mo (V) | 10 g/l | ammonium molybdate |
| Fe (II) | 10 g/l | sulfate |
| Sn (IV) | 10 g/l | chloride |
| Cr (III) | 10 g/l | chloride |
| Nb (V) | 10 g/l | in 5 M HF |
| Cd (II) | 10 g/l | nitrate |
| Gd (III) | 1 g/l | nitrate |
| Zr (VI) | 10 g/l | in 4 M HF |
| Al (III) | 10 g/l | chloride |
| HF | 7 M | |
| $HNO_3$ | 8 M | |
| HCl | 6 M | |

[1]The solutions analyzed consisted of 25 μg or boron in 5 μl of water to which 5 μl aliquots of the concomitant(s) solutions were added.
[2]300 μl of sulfuric acid, 100 μl of methanol, and 25 μl of the aluminum chloride solution were used for this study.

The only major chemical interferents found were fluoride and water. Free fluoride in acidic solutions rapidly converts boron to the very stable fluoborate ion, which is not readily converted to the borate ester. This problem may be solved by adding a large excess of aluminum ions to the sample prior to the addition of sulfuric acid. The aluminum complexes the fluoride ion so that it is not free to react with the boron present in the samples. The most suitable means of adding aluminum to the sample is as a saturated solution of aluminum chloride hexahydrate. This compound has a solubility in water of about 130 grams per 100 ml which permits the addition of a tremendous excess of aluminum ion without an undue excess of water. The amount of the solution used is not critical. A 5 μl sample of boron at a concentration of 5 g/l in a 7 M HF matrix may be reacted with anywhere from 10 to 50 μl of saturated aluminum chloride solution. For routine analytical work, 50 μl of the aluminum chloride solution is suitable for use with sample volumes from 5 to 25 μl. The aluminum chloride solution should be added to the sample approximately 1 minute before the addition of the sulfuric acid. Another advantage of the use of aluminum chloride as opposed to other aluminum salts is that the effervescent evolution of hydrogen chloride gas upon the addition of the sulfuric acid tends to inhibit the formation of aluminum sulfate percipitate which would otherwise occlude some of the boron in the sample. The final analysis should be completed within about 10 minutes after the addition of the acid because a precipitate will eventually form.

Water is also an interferent. It is a product of the esterification reaction and consequently excess concentrations of water tend to inhibit quantitative ester formation. The effect of water on the analytical response of the method is shown in Table III. Twenty-five μg of boron in various total volumes of water were treated with 25 μl of the saturated aluminum chloride solution, 300 μl of $H_2SO_4$ and 1000 μl of methanol. It may be seen from the table that there is no effect on the integrated signal until the amount of water exceeds 50 μl. However, the peak shapes do tend to be shorter and broader as the total volume of water increases, therefore, the volumes of the sample aliquots should equal those of the standard solution aliquots if peak height rather than peak area is taken as the measure of analytical response. This may be avoided by minimizing the amount of water present in the sample. The effect of water is somewhat lessened by the presence of the aluminum salt due to the well documented affinity of aluminum ions for water.

TABLE III

EFFECT OF WATER[1]

| Total Water (μl) | Peak Integral[2] | Peak Height |
|---|---|---|
| 5 | 3.370 | 0.231 |
| 10 | 3.405 | 0.223 |
| 25 | 3.440 | 0.218 |
| 55 | 3.373 | 0.190 |
| 105 | 2.997 | 0.153 |
| 155 | 2.595 | 0.110 |

[1]25 μl of saturated $AlCl_3$, 300 μl of $H_2SO_4$, and 1 ml of methanol.
[2]a one minute integration period was used.

The application of the invention can be readily understood by the following example.

EXAMPLE I

Figure 3:
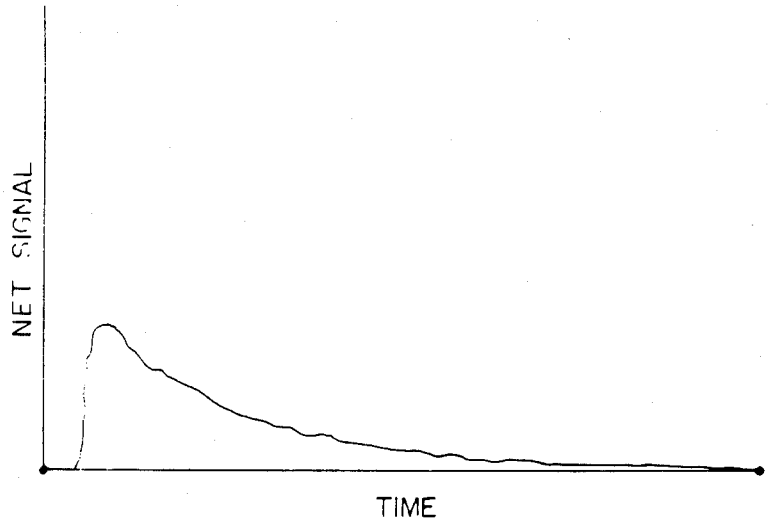
FIG. 3 is an illustration of a typical emission signal obtained from the apparatus shown in FIG. 1.

A 10 μl aliquot of sample solution containing 25 μg of boron was placed in an apparatus such as is shown in FIG. 1. The vessel 10 was 10 cm long and has an inner diameter of 12 mm. The sample was treated with 20 μl of saturated aluminum chloride solution, 300 μl of sulfuric acid and 1000 μl of methanol. The spectroscopic instrumentation comprised an Instrumentation Laboratories IL 951 AAS/AES spectrometer with a standard 10 cm air-acetylene slot burner. The acetylene flow rate was 4.5 SCFH (standard cubic feet per hour) and the air flow rate was 21 SCFH. The sample uptake rate through the nebulizer was 7 ml/minute. A wide range, multi-alkali photomultiplier tube was used with the maximum permissible instrumental bandpass of 2 nm centered on the 548 nm $BO_2$ emission band. The spectrometer was activated at the same moment the methanol was added to vessel 10. The signal emitted is illustrated in FIG. 3. It may be seen that the signal rises in approximately 2 seconds and decays exponentially with a decay constant of approximately 10 seconds. A 45 second integration period is adequate to capture over 95% of the total peak area. At the same time this time span reduces the deleterious effect of base line drift encountered with longer integration periods.

EXAMPLE II

Figure 4:
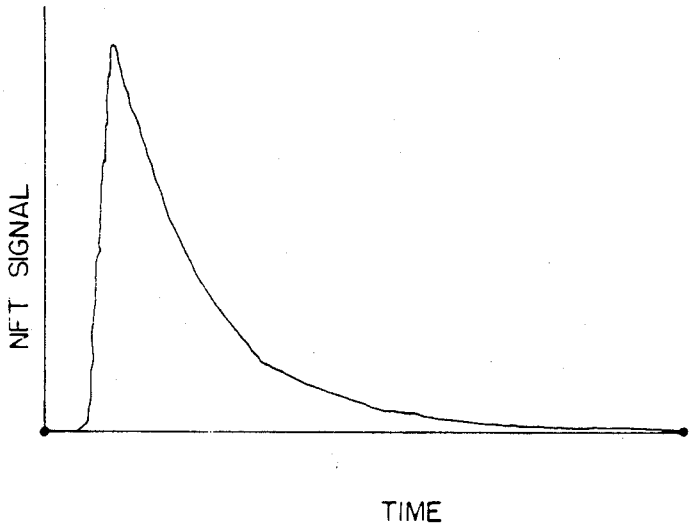
FIG. 4 is an illustration of a typical emission signal obtained from the apparatus shown in FIG. 2.

A sample was run as in Example I except that the apparatus of FIG. 2 was used. The signal emitted is illustrated in FIG. 4. It may be seen that the peak is much sharper, so that peak height rather than peak area may be used as a measure of analytical response if desired.

The foregoing description of a preferred embodiment is not intended to limit the invention to the precise form disclosed. Clearly many modifications are possible in view of the above. The embodiments and examples were chosen in order to best explain the principle of the invention and its practical applications.

The embodiments of the invention in which an exclusive property or privilege is claimed are defined as follows:

1. A method for the preparation of a liquid sample for the quantitative determination of boron by flame photometry comprising:

a. combining the sample with an excess of sulfuric acid in a vessel to dehydrate the sample, b. adding sufficient methanol to said vessel to react with the boron present in the dehydrated sample to form trimethyl borate and to react exothermically with the excess of sulfuric acid to generate sufficient heat in the vessel to volatilize said trimethyl borate, c. rapidly transferring said volatilized trimethyl borate from said vessel to a flame photometer, whereby boron is determined by flame photometric analysis of the trimethyl borate.

2. The method of claim 1 wherein the relative volume of sample to sulfuric acid to methanol are about 1:10:30.

3. The method of claim 2 wherein methanol is added to said vessel within about 3 to 10 minutes after the sample and sulfuric acid are combined within said vessel.

4. The method of claim 3 including the additional step of adding a saturated solution of aluminum chloride to the sample before combining the sample and sulfuric acid, said aluminum being added in an amount sufficient to complex any fluoride ion which may be present in the sample solution.

5. The method of claim 4 wherein the volatilized trimethyl borate is transferred to said flame photometer by applying a partial vacuum to said vessel.

6. The method of claim 4 wherein the volatilized trimethyl borate is transferred to said flame photometer by applying a positive pressure to said vessel.

7. The method of claim 1 wherein the liquid sample is an aqueous sample.

8. An apparatus for analyzing a liquid sample for boron comprising:

a vessel having a small heat capacity and an open top for containing the liquid sample and sulfuric acid, stopper means in the open top for sealing the vessel, methanol adding means in the vessel for adding methanol to the sample and sulfuric acid whereby the methanol will react with the boron in the sample to form a trimethyl borate ester and react with the sulfuric acid to produce heat to vaporize the borate ester to a gas, a sample tube penetrating the stopper for directing the gaseous boron ester from the vessel, excitation means connected to the sample tube for exciting the boron to emit a characteristic spectrum, and detection means for detecting the characteristic spectrum and determining the spectral intensity, the intensity being directly proportional to the amount of boron in the sample.

9. The apparatus of claim 8 wherein the methanol adding means is a generally tube-shaped member having a first portion exterior of the vessel for receiving the methanol and a second portion penetrating the stopper means for directing the methanol to the liquid sample and sulfuric acid.

10. The apparatus of claim 8 wherein the first portion of the tube-shaped member is provided with resisting means for resisting the reverse flow of methanol through the member.

11. The apparatus of claim 10 wherein the resisting means comprise a plurality of fingers projecting into the first portion.

12. The apparatus of claim 8 wherein the methanol adding means is a tubular-shaped sidearm extending from the vessel for containing the methanol and air inlet means penetrating the stopper means for providing air into the vessel to force the gaseous ester out the sample tube.

13. The apparatus of claim 1 wherein the excitation means and detection means is a flame photometer.

14. The apparatus of claim 12 wherein the excitation means and detection means is a flame photometer.

* * * * *